Dec. 28, 1926.
W. E. WILLIAMS
CONCAVE DISK WHEEL
Filed Oct. 3, 1921
1,611,975
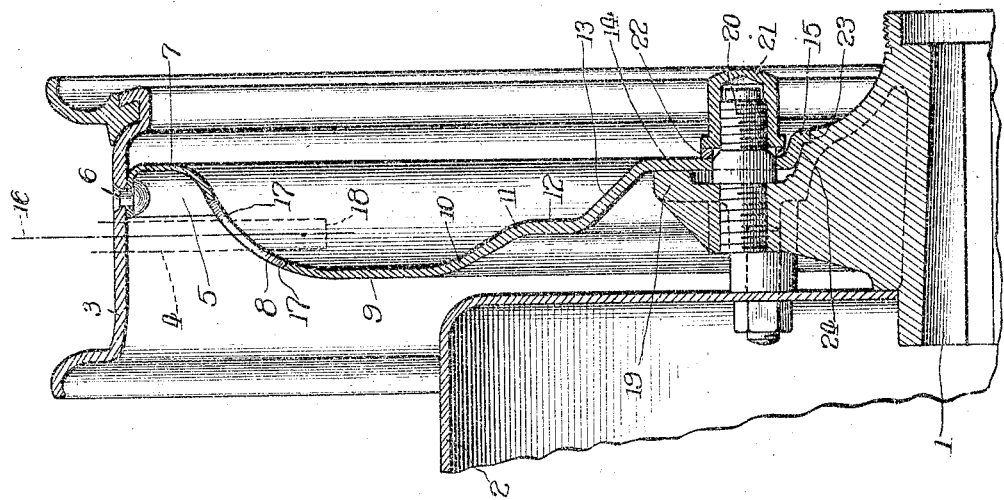
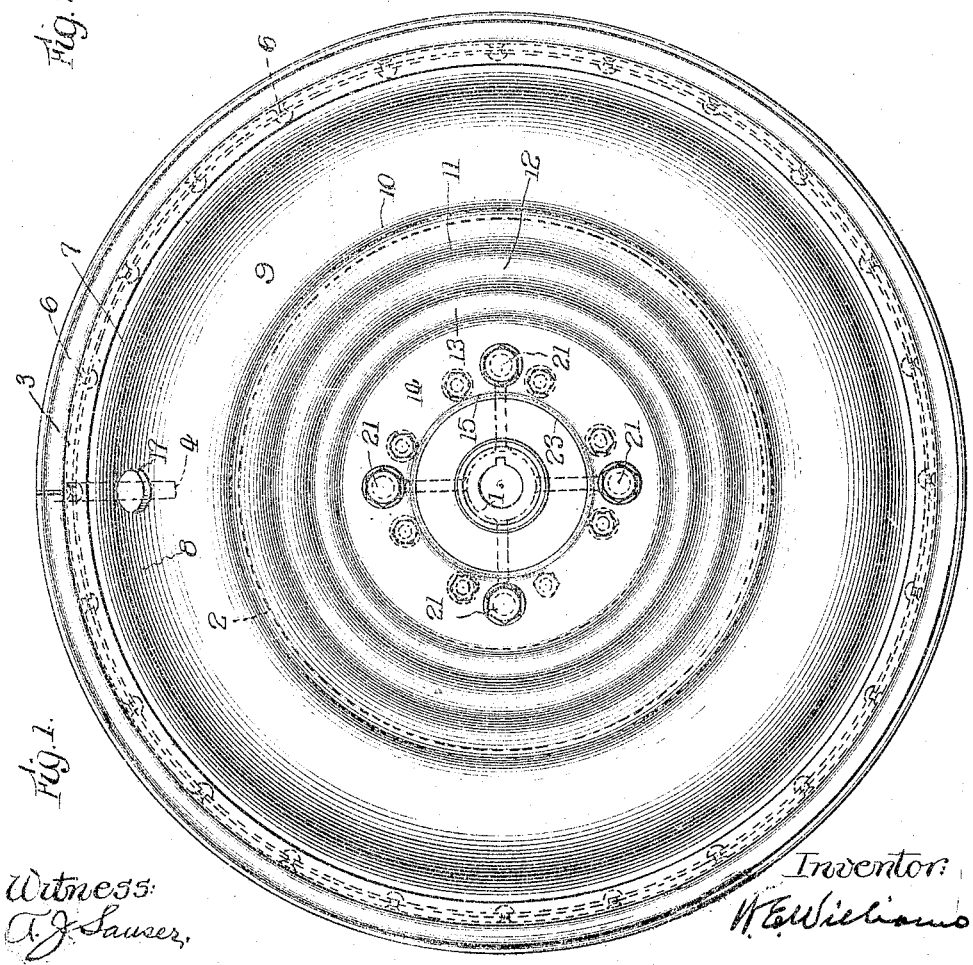
Witness:
T. J. Sauser,
Inventor:
W. E. Williams Patented Dec. 28, 1926.

1,611,975

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

CONCAVE DISK WHEEL.

Application filed October 3, 1921. Serial No. 504,843.

My invention relates to wheels which are peculiarly adapted for use with automobiles, and the object of the invention is to provide a desirable shaped disk and mounting for the disk that will permit acess to the inflating valve of a pneumatic tire from the outside of a wheel and at the same time will furnish a very stiff disk for skid shocks and provide a suitable and desirable mounting for the disk upon the hub of the wheel.

Reference will be had to the accompanying drawing in which Figure 1 is a front elevation of the wheel.

Figure 2 is a radial transverse section of the wheel.

In the drawings, 1 indicates the ordinary rear hub of an automobile wheel, 2 the ordinary brake drum secured to the hub of the wheel, 3 an ordinary rim used for a pneumatic tire of what is known as the straight side type, and 4 shows in dotted lines the ordinary air valve stem of a pneumatic tire, the tire itself not being shown in the drawings.

The web of my wheel is made of a single disk, being thinner at the margin and thicker in the middle around the hub in order to provide a proper distribution of the metal involved in the strains of the wheel. This disk web of the wheel is provided with an outer flange 5 pressed into the rim and secured thereto by rivets 6 by other suitable means.

From the flange 5 the metal of the disk is curved over into a front face 7 simulating the position of a felloe of a spoked wheel and from this surface 7 the disk is carried sharply inward, forming a curved 8 which merges into the zone 9 which again merges into a curve 10 extending outward toward the front face of the wheel to form a bulge or curved portion 11, continuous with a plane zone 12 from the inner margin of which extends an outwardly inclined portion 13 which is merged into a flat radially disposed hub zone section 14 provided with a marginal flange or lip 15.

The curved portion 8 and the portion 9 parallel to the general plane of the wheel, extend inward from the central load line 16, and an aperture is formed at 17 in the section 8, this aperture allowing the valve stem 4 to project into position for ready access to its end 18 for filling and testing the air of the pneumatic tire.

The maximum shocks involved in wheels of this class are what are known as lateral or skid shocks and when a disk wheel is subject to skid shocks the shape of the disk becomes an important factor in its ability to sustain the shocks. The nearer a single disk approaches a flat surface the weaker is the disk in resisting skid shocks, and any large flat area of a disk weakens its ability to sustain skid shocks.

The shape of my disk as indicated by the outward face 7 curved inward to make air valve clearance as indicated, furnishes a very rigid zone for the outer zone of the disk and the curved region 11, and the inclined section 13 furnishes a ribbed structural zone or a stiffening zone around the hub connection, which greatly strengthens the disk's resistance to skid shock strains.

The hub 1 is provided with the outer flange 19 against which the zone 14 of the disk is fixed by stud bolts 20 having special nuts 21 held against accidental displacement by lock washers 22. The inner flange 15 of the disk is provided with a registering centering seat 23 on the hub, together with an inclined seat 24, which takes the vertical rolling load and takes up the slack on the fit of the disk on the hub. The centering bearing 23 of the hub in combination with the inclined bearing 24 allows the wheel to be easily mounted and demounted and yet gives a rigid fit avoiding joint movement under influence of the rolling load. The straight flange 19 on the hub insures a true mounting of the disk that prevents any wabble of the wheel in rolling and thus I secure a true concentric tight mounting of my disk on the hub.

What I claim is:

1. An outwardly concave wheel disk having near but radially outside its hub zone, a zone near and approximately parallel to the load plane, near the rim a parallel zone in front of that plane, and between the two zones a third parallel zone in the rear of that plane, the three zones being integrally connected by intermediate disk zones.

2. An outwardly concave wheel disk having a peripheral zone at some distance in front of and parallel to the central load plane, a parallel zone much nearer the center of the web and approximately in said plane, an intermediate parallel zone at some distance in the rear of said plane and integrally connected with both the other zones by inclined disk zones extending toward the front of the wheel.

3. An outwardly concave wheel disk having a peripheral zone at some distance in front of and parallel to the central load plane, a parallel zone much nearer the center of the disk and approximately in said plane, an intermediate parallel zone at some distance in the rear of said plane and integrally connected with both the other zones by inclined disk zones extending toward the front of the wheel disk; the outer inclined zone having a valve stem opening between the planes of the front and rear zones.

4. A wheel disk having a concave front face and near its central opening an annular zone extending obliquely toward the front and toward said opening to engage a suitable incline on a hub and having around said opening a narrow inwardly turned disk-registering flange to fit a corresponding shoulder on a hub, substantially as set forth.

5. In a wheel of the class described, a forwardly concave wheel disk having a front face zone simulating the felloe of a spoke wheel and curved inward therefrom far beyond the central load plane, thence extend ing parallel to that plane for some distance, and returning toward that plane to merge in a zone of undulate radial cross-section from which the disk extends to the hub.

6. In a wheel of the class described, a disk concave toward the front and connected to a rim in front of the central load plane, extending rearwardly past that plane to allow access to a valve stem, and later forwardly and toward the hub opening as a web having annular formations therein.

7. In a wheel of the class described, a concave wheel disk having around the hub opening a zone parallel to the plane of the wheel's revolution and adapted to bear laterally on a hub flange, a zone outside the portion for bearing on a hub flange extending away from the front and provided with annular stiffening formations therein, said last-mentioned zone being integrally connected with a peripheral rim-supporting portion of the disk in front of the load plane.

Signed at Chicago, in the county of Cook and State of Illinois, this 30th day of September, 1921.

WILLIAM ERASTUS WILLIAMS.